United States Patent
Fulcher et al.

(10) Patent No.: US 8,050,067 B2
(45) Date of Patent: Nov. 1, 2011

(54) METHOD AND CONTROL SYSTEM FOR CONTROLLING POWER CONVERSION IN A POWER CONVERTER

(75) Inventors: Robert Vernon Fulcher, Stoke on Trent (GB); Rodney Jones, Stoke on Trent (GB); Philip Perry Waite, Newcastle (GB)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/987,203

(22) Filed: Jan. 10, 2011

(65) Prior Publication Data

US 2011/0170323 A1 Jul. 14, 2011

(30) Foreign Application Priority Data

Jan. 14, 2010 (EP) .................................. 10000316

(51) Int. Cl.
*H02J 1/10* (2006.01)
(52) U.S. Cl. ........................................................ 363/72
(58) Field of Classification Search .................... 363/72, 363/71, 56.03
See application file for complete search history.

(56) References Cited

U.S. PATENT DOCUMENTS

| 6,389,041 | B1 | 5/2002 | Morita et al. |
| 7,502,240 | B2 * | 3/2009 | Leung et al. ..................... 363/72 |
| 2006/0022656 | A1 | 2/2006 | Leung et al. |

FOREIGN PATENT DOCUMENTS

| JP | 2005333246 A | 12/2005 |
| WO | WO 2009087063 A1 | 7/2009 |

* cited by examiner

*Primary Examiner* — Shawn Riley

(57) ABSTRACT

A control system for controlling conversion of an input power into an output power in a converter module is provided. The control system includes an input power terminal, an output power terminal, and an active switching device. The control system further includes a master controller and a communication link interconnecting the master controller and the converter module. Also, the system has a timing generator generating a timing signal with a cycle time equal to or less than the shortest time constant of the converter module and immediate power circuit elements relating to the converter module. The timing generator is integrated in or interconnected with the master controller. Furthermore, the control system has a signal generator integrated in or interconnected with the master controller generating switching control signals, each switching control signal containing a control message defining a switching state for the active switching device.

19 Claims, 4 Drawing Sheets

METHOD AND CONTROL SYSTEM FOR CONTROLLING POWER CONVERSION IN A POWER CONVERTER

CROSS REFERENCE TO RELATED APPLICATIONS

This application claims priority of European Patent Office Application No. 10000316.9 EP filed Jan. 14, 2010, which is incorporated by reference herein in its entirety.

FIELD OF INVENTION

The present invention relates to controlling conversion of power in at least one converter module by use of switching control signals sent from a master controller to a converter module. In addition, the invention relates to a control system for controlling power conversion by use of a master controller. Furthermore, the invention relates to a power converter.

BACKGROUND OF INVENTION

Power converters are, for example, used in wind turbines for converting a variable frequency AC power provided by the wind turbine generator into a nominally fixed frequency AC power to be fed to a grid. Such power converters typically comprise a rectifier or active rectifier for converting the variable frequency AC power into a DC power and an inverter for converting the DC power into the fixed frequency AC power. Both the rectifier and the inverter typically comprise two DC voltage terminals and three AC voltage terminals. In case of the rectifier the AC voltage terminals are connected to the generator output terminals providing, e.g., a three phase AC power and the DC terminals are connected to a DC link between the rectifier, and the inverter. The inverter also comprises two DC terminals connected to the DC link. In addition, it comprises three AC terminals connected to a grid via appropriate filtering circuits as may be required. Active rectifier and inverter may be formed from the same circuit components but with different power flow (AC to DC in case of the active rectifier, DC to AC in case of the inverter).

Other applications of power converters comprise, i.e., conversion of a fixed frequency AC power to a variable frequency AC power, for example for controlling the rotational speed and/or torque of an electric motor.

Typical configurations of a rectifier and an inverter, both commonly referred to as power converters in the following, comprise a series of at least two active switching devices connected between the upper voltage level of the DC link and the lower voltage level of the DC link and a node between both active switching devices which is connected to one of the AC terminals. Such a design is known as half bridge, or phase. The same structure is present for all other AC voltage terminals of the power converter so that a power converter for a three phase AC power has three half bridges each comprising at least two active switching devices. The structure with two active switching devices in a given half-bridge is known as a two-level converter in that by appropriate control the output voltage seen at the centre phase terminal can be either the upper voltage level of the DC link or the lower voltage level of the de link.

Power conversion by use of the active switching devices is typically done in the following way:

In case of converting DC power to AC power each AC voltage terminal is connected through the active switching devices to the high DC level and the low DC level in an alternating fashion. By introducing a phase shift between the command signals defining the output of each AC terminal a polyphase AC power, for example a three phase AC power, can be established. The AC power may be designed to be a balanced AC power, e.g. a three phase AC power in which the three phase currents always sum up to zero.

In case of converting AC power into DC power the active switching devices are switched for each AC input terminal such that the terminal is connected to the upper DC voltage terminal or the lower DC voltage terminal.

For both modes of power conversion, switching the active switching devices is typically performed on the basis of a pulse width modulation scheme in which time and duration of an active switching device being ON, i.e. conductive, or OFF, i.e. non-conductive, is defined by high level or low level switching pulses, respectively. Other schemes for determining the switching of the active devices is equally valid including direct power control, direct current control, direct torque control or equivalent.

Sometimes, two or more half bridges are connected in parallel or in series to an AC terminal, in particular in power converters having a high power rating. In case, for example, three half bridges each comprising two switching devices would be connected in parallel in a three phase converter the whole power converter would comprise 12 active switching devices (three times two times two). Typically, a power converter comprising parallel or serial half bridges is organized in the form of converter modules each of which comprises one half bridge for each of the AC terminals. These power modules are connected in parallel or in series to form the power converter. In particular, for high power rated power converters for industrial drives and renewable energy applications, it is a standard technique to construct these converters from multiple converter modules operating in parallel or in series to achieve the necessary voltage, current and power rating.

It is desirable to use a central controller for all converter modules in a power converter. A difficulty thereby is to build a communication system between the central controller, which could also be considered as a main control system or a real time computer, running the control algorithms and the distributed converter modules of the power converter. The main requirements of such of a communication systems are to transmit the switching control signals to the converter modules with a high degree of timing precision, a high degree of edge resolution of the switching states in a given pulse width modulation scheme, a low latency response to error conditions, and tolerance to single bit errors. Furthermore, it should comprise viable and affordable physical media for interconnections between the central controller and the converter modules. In addition, the communication system should preferably be able to transmit current, voltage and other analogue feedback signals and logical status signals, i.e. digital signals, from the converter modules to the central controller.

Document WO 2009/087063 A1 discloses a power converter with distributed cell control in which a central control unit transmits a reference AC voltage and a switching carrier signal to controller subunits where each subunit controls the switching of power electronic switches according to a pulse width modulation pattern so that each time the switching carrier signal crosses the reference AC voltage either a high DC voltage or a low DC voltage is applied to output terminals of the corresponding converter submodule. Hence, the actual switching signals for the active switching devices are determined at a local level rather than by the central controller. It is, however, desirable to calculate all switching states at the central controller. This, however, means that in case of a three phase AC converter using a two-level half bridge structure for each converter module at least twelve switching states need to be transmitted within a given PWM period (a switching state representing the "on-state" and a switching state representing the "off-state" for each of the six active switching devices).

There exist two approaches to transmit the switching states from a central controller to the converter module in the state of the art. The first one is to use a parallel connection from the central controller to each of the distributed converter modules. Such a parallel connection would typically be an electrical ribbon cable. This parallel connection carries individual copper communication channels for each piece of data, e.g. six ways for the switching control signals for the active switching devices, three ways for the three current feedback signals, three ways for three voltage feedback signals, etc. This kind of parallel connection has some drawbacks, for example, the amount of circuitry that is needed at both ends of the communication link. Moreover, the information transferred over the communication link is fixed by the circuitry at both ends so that this type of connection is inflexible. In addition, the distance which can be realised with a parallel connection channel is usually restricted.

The second state of the art approach to a link comprises a high-performance serial link. The connection topology for such a link is a daisy chain system. However, this means that the data payload is comparatively large as the single connection from/to the central controller has to carry information for all the distributed converter modules, and the message interval therefore has to be large to keep the bandwidth requirement of the communication channel within a practical and affordable range. Typically, the message interval is once per pulse width modulation period. This means that emergency conditions have to be catered for by a separate connection between the converter modules. Additionally, certain control modes which have a CPU calculation period less than the cycle time of the communication link are not realisable in this system.

SUMMARY OF INVENTION

It is therefore an objective of the present invention to provide an advantageous control method and an advantageous control system which are, in particular, suitable for use with distributed power modules controlled by a central controller.

It is a further objective of the present invention to provide an advantageous power converter with distributed converter modules and a central controller.

The first objective is solved by a method for controlling conversion of DC power into AC power, or vice versa, and by a control system for controlling conversion of DC power into AC power, or vice versa, in a converter module, as claimed in the independent claims. The second objective is solved by a power converter as claimed in a further independent claim. The dependent claims contain further developments of the invention.

The inventive method is a method for controlling conversion of an input power into an output power in at least one converter module comprising at least one input power terminal, at least one output power terminal, and for each output power terminal at least one active switching device connected between an input power and the respective output power terminal. The method controls the power conversion by controlling the timing of switching the at least one active switching device in each converter module. The switching is controlled by sending switching control signals from a master controller, which may, e.g., be a central controller or a selected one of a number of equivalent controllers, to each converter module, each switching control signal containing a control message defining a switching state (or switching states in case of a converter module with at least two active switching devices) for the at least one active switching device (i.e. one switching state for each active switching device in a converter module) and time relative to a time reference derived from the master controller at which the defined switching state for the at least one active switching device is to be applied in the respective converter module. According to the inventive method, the switching control signals are sent with a cycle time that is equal to or less than the shortest time constant of a used converter module and the immediate power circuit elements relating to the used respective converter module and the duration of a control message is equal to, or less than, the cycle time. Note that in case the converter module comprises more than one active switching device the control message contains individual switching states for each active switching device without explicitly mentioning it in the following.

Such short cycle times and control messages allow for connecting a master controller like, e.g., a central controller to distributed converter modules by serial connection links like, for example, optical fibres or a differential pair copper cables. The whole control architecture can then be realised in form of a radial communication system between the central controller and the converter modules with minimum payload, and hence, with minimum bandwidth requirement, on each communication link. Furthermore, the short message duration means that the response time to errors, or transient conditions, is reduced, increasing the potential control performance since the rate at which any errors in current or voltage increase in the converter module and immediate power circuit is determined by the transient characteristics (time constant) of the total power circuit. Having a message duration, or message cycle time, which is not more than the shortest time constant of the converter module therefore allows for the mentioned increase of control performance.

In addition, the transmission of the switching states for each half bridge of a converter module built up of half bridges, and the short time of these states means that the system is independent of the control or pulse width modulation strategy applied to the parallel, or otherwise connected, converter modules. Indeed, the converter modules can have different switching strategies and frequencies, if required.

The inventive method can be equally applied to current source inverters as to voltage source inverters.

In particular, the switching control signals are sent with a cycle time that is equal to, or less than, the dead time of the used active switching devices. This further development of the present control method is based on the insight that the minimum time constant in a converter module is typically given by the dead time of the switching between the states of a active switching device. This dead time considers the turn-off delay inherent in the characteristics of the active switching devices. For example, in a converter module comprising two half bridges, the minimum time constant in the converter module is typically given by the fact that the second switching device of a half bridge is only allowed to be turned on after one can be sure that the first switching device has been turned off for sufficient time for the first switching device to become high impedance.

Another method of assessing the minimum time constant in the power converter is to consider the evolution of a fault—how fast does the control system need to respond to prevent excessive current flowing in the switching devices given the loop inductance of the immediate power circuit and the margin between operational current levels and the current level at which power devices have to be turned off for protection purposes.

Typically the delay accounting for the dead time is 2 μs, and the minimum pulse times in a pulse width modulation scheme are typically 4 μs. However, the edge resolution of switching states in a given pulse width modulation period is preferably less than 100 ns. In addition, the pulse width modulation edge accuracy between different converter modules is also preferably less than 100 ns. Hence, according to another further development of the inventive control method, the control message contains timing information defining times within the cycle time at which the switching state (or states) contained in the control message is to be applied to the at least one active switching device in the respective converter module. The timing information has a time resolution that is higher than the cycle time, and high enough to meet the 100 ns requirement above. However, a time resolution that is at least one order of magnitude higher than the cycle time is also possible.

According to the inventive control method, the switching state (or states in case of a converter module with more than one active switching device) to be applied to the at least one active switching device of a converter module may be contained at least threefold in a control message. Then, a majority voting algorithm is applied to the threefold switching states for determining the actual switching state (or states) to be applied to the at least one active switching device. This development is advantageous in the event of a single message error since it allows the converter system to carry on running. In the described development, any single bit error can be eliminated by the majority voting. However, multiple bit errors cannot to be corrected by this method.

Additionally, or alternatively, each control method could also contain a CRC-code (cyclic redundancy check code). Then, a CRC-check is performed on each control message, and the switching state (or states) contained in the control message are not applied to the at least one active switching device of the respective converter module if the CRC-check fails. In other words, a message received in error is not used. Hence, the state of the at least one active switching device remains in the state defined by the previous control message. In this case, the converter module will be in the incorrect state for one cycle period, however as the cycle time has been defined to be less than the time constant of the power circuit, the incorrect state will not lead to current/voltage outside the capability of the power circuit.

When the CRC-check, or majority voting, for the switching state (or states) contained in the control message following a predetermined number of control messages for which the CRC-check, or majority voting, has failed is successful this switching state is applied to the at least one active switching device so that a fault ride through ability of the converter module exists. In case also the CRC-check, or majority voting, for the switching state contained in the control message following a predetermined number of control messages for which the CRC-check, or majority voting, has failed also fails the respective converter module is set to a fault state.

Advantageously, a full-duplex data transmission is used for transmitting the control signals to the at least one converter module. This allows to use the same transmission line for acquiring voltage feedback signals and/or current feedback signals and/or intervention signals, etc. from the at least one converter module to the central controller with the same cycle time than the switching control signals. Full duplex is two separate paths—a (control) path containing the switching state and time information and a separate (feedback) path containing the voltage feedback signals and/or current feedback signals and/or intervention signals, etc.

An inventive control system for controlling conversion of an input power into an output power in a converter module comprising at least one input power terminal, at least one output power terminal, and for each output power terminal at least one active switching device connected between the an input power terminal and the respective output power terminal, allows for controlling the timing of the switching of the at least one active switching device according to the inventive control method. The control system comprises a master controller, which may, e.g., be a central controller or a selected one of a number of equivalent controllers, and, for each converter module controlled by the master controller, a communication link interconnecting the master controller and the respective converter module. According to the invention, the control system comprises a timing generator generating a timing signal having a cycle time that is equal to, or less than, the shortest time constant of the converter modules interconnected with the master controller and the immediate power circuit elements relating to the used respective converter modules. The timing generator (45) is integrated in or interconnected with the master controller. Furthermore, a signal generator is integrated in or interconnected with the master controller. This signal generator generates switching control signals, each switching control signal containing a control message defining a switching state (or switching states in case of a converter module with at least two active switching devices) for the at least one active switching device in a converter module interconnected with the master controller, where the duration of each control message is equal to, or less than, the cycle time. As the communication links, serial communication links are used.

The use of serial communication links becomes possible due to performing the inventive method. Using serial communication links connecting each individual converter module with the master controller is advantageous over the use of parallel communication links in that less circuitry at both ends of the communication link is necessary and the flexibility of the information transferred is higher. Moreover, the serial communication link can be longer than a parallel communication link. With respect to the mentioned daisy chain connection by high-performance serial links, such as Ethercat, the inventive control system is advantageous in that a radial communication system can be formed and data payload and bandwidth requirements of each communication link can be kept small.

It is particularly advantageous if the communication links used are full-duplex links so that not only the switching control signals can be sent to the converter modules but also feedback signals like current feedback signals or voltage feedback signals, or other kinds of signals can be transferred from the converter modules to the central controller without using a time multiplexing scheme.

According to a further development of the inventive control system, at least two converter modules may be present which are connected in parallel or in series. Each converter module then comprises at least one input power terminal, at least one output power terminal, and for each output power terminal at least one active switching device connected between an input power terminal and the respective output power terminal. Connecting at least two converter modules in parallel or in series allows for increasing the power rating of a power converter.

In particular, each converter module may comprise at least a high voltage DC terminal and a low voltage DC terminal as input power terminals or output power terminals and at least two AC terminals, in particular three AC terminals, as output power terminals or input power terminals, respectively, and, for each AC terminal, at least an upper switching device connected between the high DC voltage terminal and the respective AC voltage terminal and at least a lower active switching device connected between the low DC voltage terminal and the respective AC voltage terminal. This development of the inventive control system allows for transforming DC power into polyphase AC power, or polyphase AC power into DC power. An important application is the use of three AC terminals for converting DC power to three phase AC power, or vice versa. Such converters converting DC power to three phase AC power, or vice versa, are typically used in many industrial drives and in renewable energy applications, such as wind turbines. In particular, if a high power rating is desired, two or more converter modules comprising at least two AC terminals, in particular three AC terminals, may be connected in parallel or in series.

To allow for single bit error correction, the signal generator may generate the control message in threefold. Then, a voting module running a majority voting algorithm on a received control message would be present in each converter module interconnected with the central controller. Hence, single bit errors can be corrected through the two versions of the control message not containing the bit error.

Additionally or alternatively, the signal generator may comprise a CRC-code generator to generate, for each control message, a CRC-code and to add the generated CRC-code to the respective control message. In this development, a CRC-check module performing a CRC-check on each received controlled message is present in each converter module interconnected with the central controller. Said CRC-module blocks the application of the switching state (or states) contained in the controller derived message to the at least one active switching device of the respective converter module in case the CRC-check fails. By this means applying incorrect switching state to the at least one active switching device of the respective converter module can be avoided.

The CRC-check module or the voting module may clear the application of the switching state (or states) contained in the control message following a number of control messages for which the CRC-check or majority voting has failed to the at least one active switching device in case the CRC-check or majority voting for said following control message is successful, or set the respective converter module to a fault state otherwise. In case the following control message satisfies the CRC-check the converter module was in the incorrect state for up to a given number of cycle times. However, the power converter and its immediate power components can be designed to be able to ride through such a short condition. Hence, a fault ride through ability of the converter module may be provided. Although such an incorrect switching state may result in a small amount of wave form distortion, it will happen sufficiently rarely such that it is tolerable. The important point is that the operation of the converter system can continue after the short timed incorrect bridge state so that the converter system is able to carry on running even if one of the control messages contains an incorrect switching state.

Typically the number of control messages for which the CRC-check or majority voting is allowed to fail would be one in order to prevent the respective converter module from being in an incorrect switching state over a too long time. However, if the converter module and the appliance connected to the converter module tolerate being in an incorrect switching state said number of control messages may be larger than one to increase the fault ride through ability.

An inventive power converter comprises at least one input power terminal, at least one output power terminal, and, for each output power terminal, at least one converter module. Each converter module comprises at least one active switching device connected between an input power terminal and the respective output power terminal. In particular, two or more converter modules may be present for each output power terminal to allow for a higher power rating. Such converter modules may be connected in parallel or in series. The power converter further comprises an inventive control system for controlling power conversion. The properties and advantages of the inventive power converter result from the already mentioned properties and advantages of the inventive control system and are, therefore, not described again.

Note that according to the present invention the master controller needs not to be separate to the converter module(s), e.g. in form of a central controller. It would be feasible to locate the master controller immediately adjacent to, or housed within one of the converter modules.

BRIEF DESCRIPTION OF THE DRAWINGS

Further features, properties and advantages of the present invention will become clear from the following description of embodiments of the invention in conjunction with the accompanying drawings.

DETAILED DESCRIPTION OF INVENTION

In the following, the present invention will exemplary be described in conjunction with the power electric converter of a wind turbine. However, the invention can also be embodied in other power converters, e.g. such power converters that are used to control a variable speed electric motor, or such power converters that are used in other renewable energy appliances like, for example, solar cells.

Figure 1:
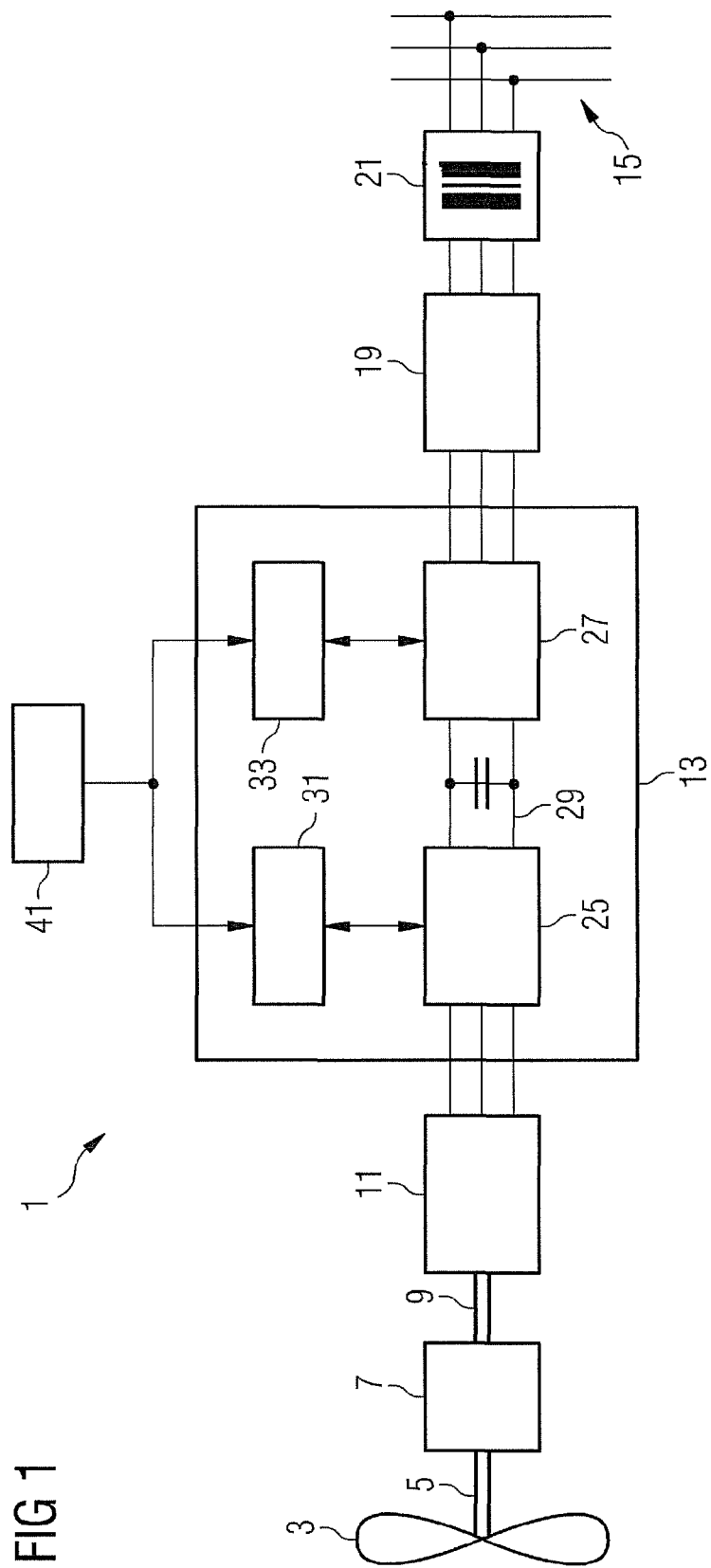
FIG. 1 schematically shows a wind turbine and its electrical equipment.

FIG. 1 schematically shows a typical wind turbine and its electrical equipment for controlling the generator and the power output. The wind turbine 1 comprises a rotor 3 with a rotor shaft 5 transmitting the rotational momentum of the turning rotor 3 to a gear box 7. In the gear box 7, a transmission of the rotation to an output shaft 9 with a certain transmission ratio takes place. The output shaft 9 is fixed to the rotor of an AC generator 11 which transforms the mechanical power provided by the rotation of the output shaft 9 into the electrical power. The AC generator 11 may either be a synchronous generator or an asynchronous generator (singly-fed or doubly-fed). In a synchronous generator, the rotor rotates with the same rotational frequency as a rotating magnetic field produced by a stator of the generator. In contrast, in an asynchronous generator, the rotational frequencies of the stator magnetic field and the rotor are different. The difference in rotational frequency is described by the slip of the generator. The generator 11 shown in FIG. 1 is a variable speed generator, i.e. the rotational speed of the rotor is allowed to vary depending on the wind conditions.

To provide a nominally fixed frequency electricity for the grid to which the wind turbine is connected, the wind turbine 1 is equipped with a power electronic converter 13 which converts parts or the whole of the varying frequency electricity delivered by the generator 11 into an electrical power having a nominally fixed frequency which is adapted to the grid. In addition, the power electronic converter 13 controls the output power of the electricity supplied by the wind turbine 1.

If a wind turbine is part of a wind farm, it is typically connected to a collector cable 15, which is part an internal intermediate voltage grid 17, through filters 19 in form of reactors and transformers 21. The internal grid 17 is connected, via a substation 23 including a transformer, to a utility grid which is typically to be operated with a certain power factor requested by the utility system operator.

The regulation of the power output of the electricity supplied by the wind turbine 1 will be described in conjunction with FIGS. 1 and 2. The power output is controlled by the power electronic converter 13 of the wind turbine 1 according to a power factor request or, alternatively, according to an active power request and a reactive power request. The power electronic converter 13 comprises an active rectifier 25 for producing a DC voltage with a high voltage level and a low voltage level from the variable frequency AC voltage provided by the wind turbine 1, an inverter 27 producing a fixed frequency AC voltage from the DC voltage, and a DC link 29 connecting the active rectifier 25 with the inverter 27. The power electronic converter 13 further includes a generator controller 31 which controls the torque reacted by the AC generator 11 by controlling the stator current or stator voltage of the AC generator 11, and an inverter controller 33 controlling the output current of the power electronic converter 13 to supply three-phase AC power having leading or lagging currents at an angle specified by the requested power factor.

The inverter controller 33 receives the voltage levels on the DC link 29, the current levels at the inverter output 37, the voltage levels between the filters 19 and the transformer 21, and current control signals from a power controller 41 and generates the current demand signals according to the requested power factor. The structure of the inverter 27 and the general structure of the inverter controller 33 are shown in FIG. 2. Likewise, the generator controller 31 receives the voltage levels on the DC link 29, the current and/or voltage levels at the generator output, and control signals from the power controller 41.

Although the present invention can be embodied with the inverter as well as with the rectifier, the following description is restricted to a description of the inverter to avoid unnecessary repetitions.

The inverter 27 comprises three pairs of active switching devices 35, like insulated gate bipolar transistors (IGBT), bipolar junction transistors, field effect transistors (MOSFETs), darlington transistors, gate turn-off thyristors or IGCTs. In the present embodiment, each pair of active switching devices 35 includes two insulated gate bipolar transistors as active switching devices 35. The pairs of active switching devices 35 are connected between the high voltage level (active switching device 35_U) and the low voltage level (active switching device 35_L) of the DC link 29. Such pairs of active switching devices 35 are also known as half-bridge or phase. The three lines of the inverter output 37 are each connected to a different one of the pairs of active switching devices 35, i.e. to a different half-bridge, and there to a node between the switching devices 35 of the respective half-bridge. By a suitable scheme of switching the active switching devices 35 the DC voltage on the voltage link 29 can be transformed into a three-phase AC voltage at the inverter output 37 with current levels so as to match the grid frequency and the requested power factor.

Figure 2:
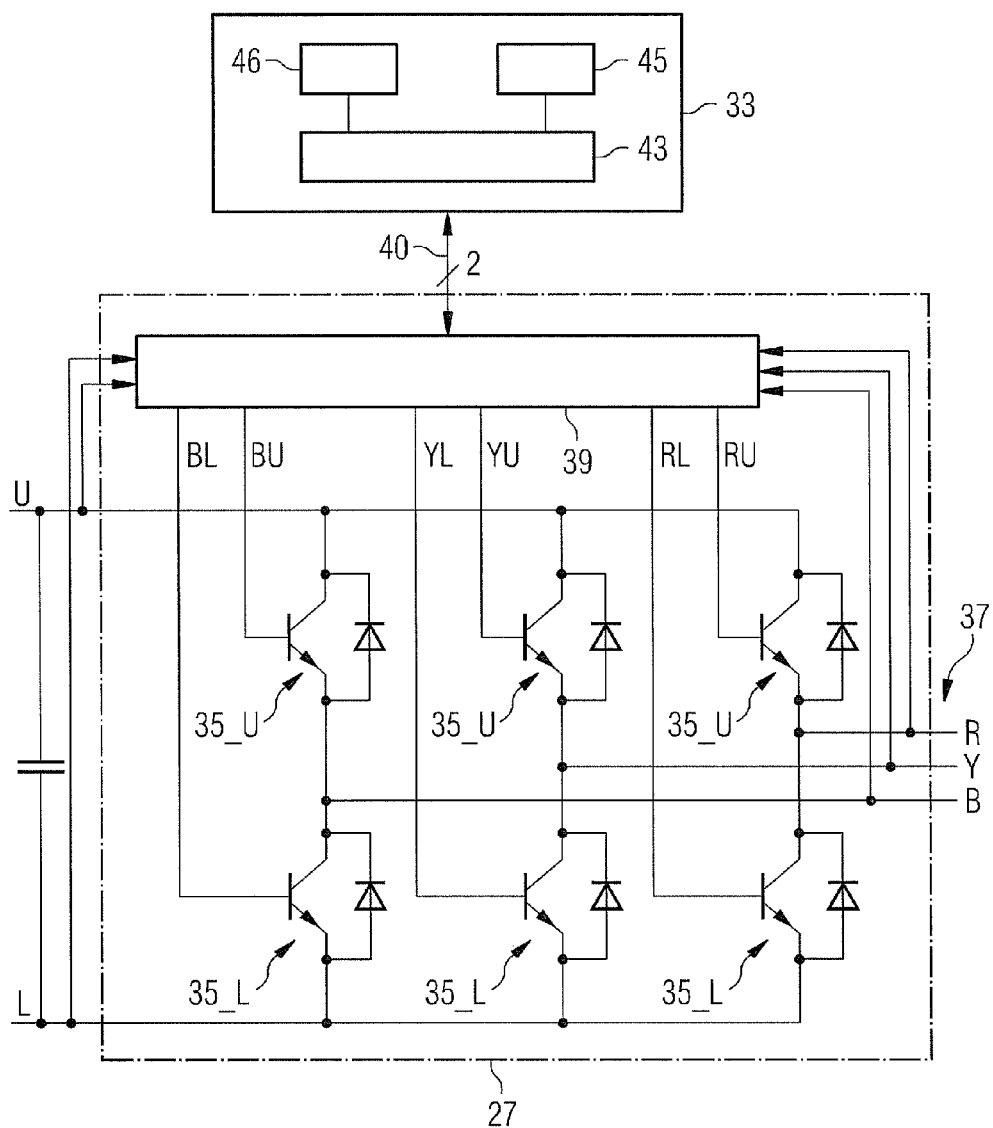
FIG. 2 shows the inverter shown in FIG. 1 and the inverter controller.

The power converter topology described with respect to the inverter 27 shown in FIG. 2 is known as 2-level converter. However, within the scope of the invention, other topologies than the topology described with respect to the inverter 27 are applicable for power converters, such as 3-level neutral clamped topologies, Floating Symmetrical Capacitor Converters, Cascade H-Bridge, etc. Since these other topologies are generally known from the state of the art they will not be described here.

The switching of the active switching devices 35 is done according to pulse width modulation scheme. A central inverter controller 33 establishes switching control signals for the active switching devices 35 of the inverter 27 according to the pulse width modulation scheme and sends them to a circuitry 39 of the inverter 27. Each switching control signal contains a control message defining switching states BL, BU, YL, YU, RL, RU to be set in the active switching devices 35 in the inverter in the following cycle time and timing information which allows the circuitry 39 to determine the exact switching times for each one of the active switching devices 35.

The circuitry 39 also acquires feedback signals like, in the present exemplary embodiment, current and voltage feedback signals from the inverter output and sends them to the central controller 43. Furthermore, the circuitry 39 may send fast intervention signals to the central inverter controller 33 such as, for example, a disable signal in case of an overcurrent being detected at the inverter output.

Figure 3:
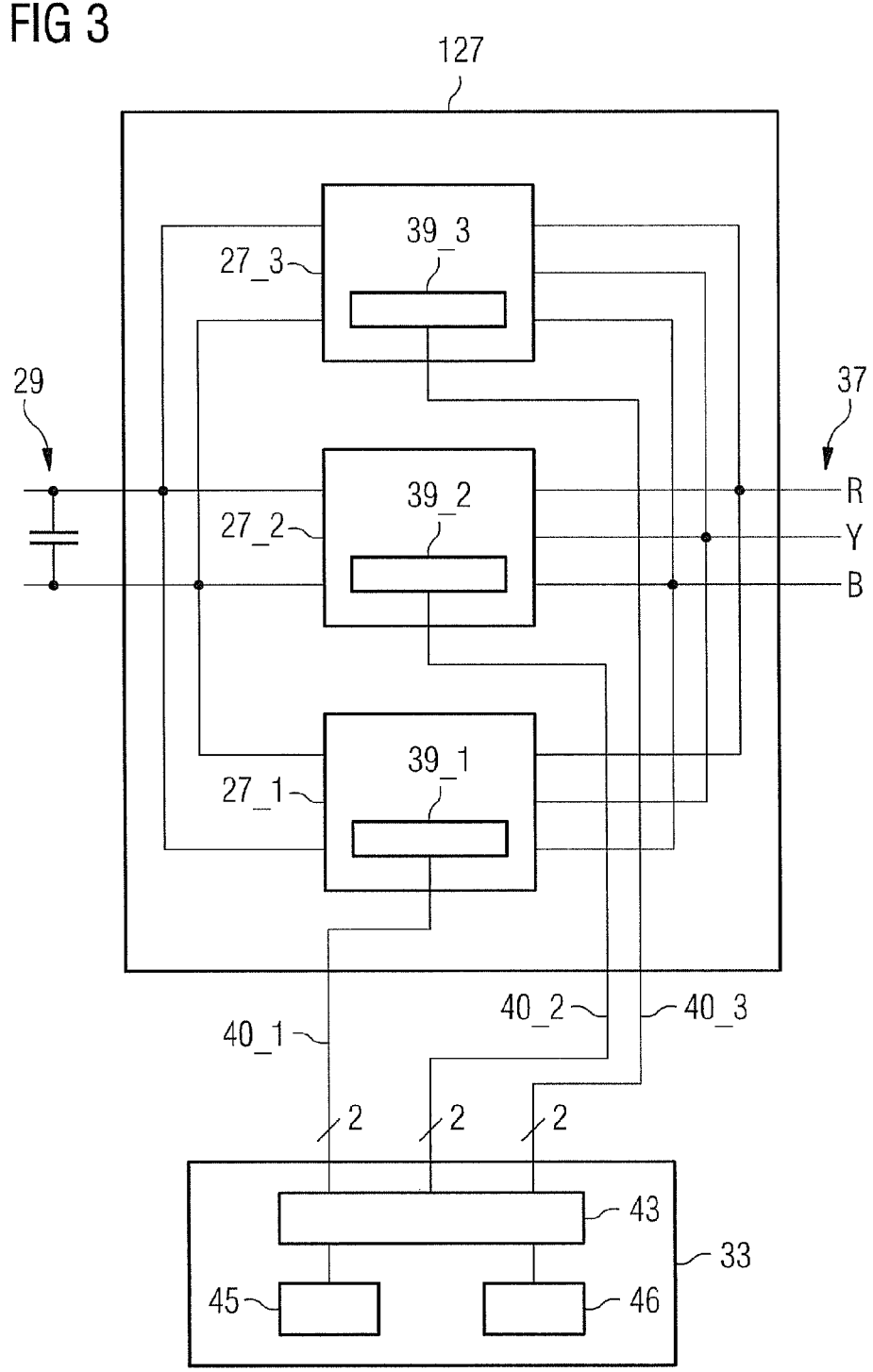
FIG. 3 schematically shows an example for a high power rated inverter.

The power rating of an inverter 27 as shown in FIG. 2, or of other power converters, can be increased by connecting a number of converter modules connected in parallel or in series. As an exemplary embodiment of a power converter having a high power rating, FIG. 3 shows an inverter 127 comprising three inverter modules 27_1, 27_2, 27_3 which are connected in parallel between a DC link 29 and an inverter output 37. Each inverter module 27_1, 27_2, 27_3 corresponds to the inverter 27 described with respect to FIG. 2. The central controller 32 controls all inverter modules 27_1, 27_2, 27_3 by providing the respective switching control signals. Each inverter module 27_1, 27_2, 27_3 is connected to the central controller 33 by a serial data link 40_1, 40_2, 40_3 in form of a single full-duplex cable, e.g. a copper wire or an optical cable.

The central controller 33 comprises a transmitting and receiving circuitry 41 that forms a serial interface for allowing serial data transmission to and from circuitries 39_1, 39_2, 39_3 of the inverter modules 27_1, 27_2, 27_3, which also form serial interfaces. A timing circuit 45 provides for a timing signal with cycle times equal to, or preferably less than, the shortest time constant of the inverter modules 27_1, 27_2, 27_3. Although not explicitly shown in FIG. 3 the circuitries 39_1, 39_2, 39_3 of the inverter modules 27_1, 27_2, 27_3 also comprise such timing circuits.

The shortest time constant in a inverter module 27_1, 27_2, 27_3 is typically the so called "dead time" of the active switching devices 35. The switching of the active switching devices 35 in a half bridge is coordinated such that the turn off delay inherent in the characteristics of the switching devices is allowed for before turning on the other device in the half bridge. The waiting time before switching on the other device is the dead time. The dead time is typically 2 μs, and the minimum pulse times in the pulse width modulation scheme are typically 4 μs. The cycle time provided by the timing circuits has, in the present embodiment, therefore been chosen to have a length of 2 μs, or less. Furthermore, the control message transmitted in a switching control signal has a duration of 2 μs, or less. Hence, by keeping the message duration at 2 μs, or less, the switching states can be easily updated with the serial data link 40_1, 40_2, 40_3.

The requirements for a converter module 27 as described with respect to FIG. 2 would be that the edge resolution of the switching states in a given pulse width modulation period is 100 ns or less. Furthermore, the timing accuracy for the edges between different converter modules 27_1, 27_2, 27_3 needs to be 100 ns, or less. To achieve this, the control message also contains timing information which allows fine timing with a time resolution of 100 ns or less.

In case of the present example, in which cycle time has a lengths of 2 μs, the timing information needs to divided into at least 20 subintervals in order to achieve a timing resolution of <100 ns. Such a subdivision can be achieved by use of a 5 bit coded message. The lowest data payload is achieved by transmitting the 5 bits of timing information, for each half bridge (or phase).

Furthermore, one bit is necessary for defining a switching state of an active switching device in a inverter module 27_1, 27_2, 27_3.

Therefore, a total of seven bits of information are required, per half bridge, per 2 μs cycle time, giving a total of 21 bits for a three-phase, two level inverter module, as in FIG. 2. This allows for each of the phases to be controlled independently from each other phase, which is a requirement of the control system.

If each power module consists of a rectifier and an inverter module, and therefore of six phases in total, then when additional formatting and control bits are considered to be present in the control message, and other miscellaneous control data, then a message length of about 100 bits are required. To transfer the whole message within the 2 μs cycle time, a clock frequency of the transmitting and receiving circuitry in the order of 50 to 100 MHz is sufficient.

It is advantageous, if the inverter (27) is able to carry on running in the event of a control message error. A first alternative for achieving this will be described with respect to FIG. 4 while a second alternative will be described with respect to FIG. 5.

Figure 4:
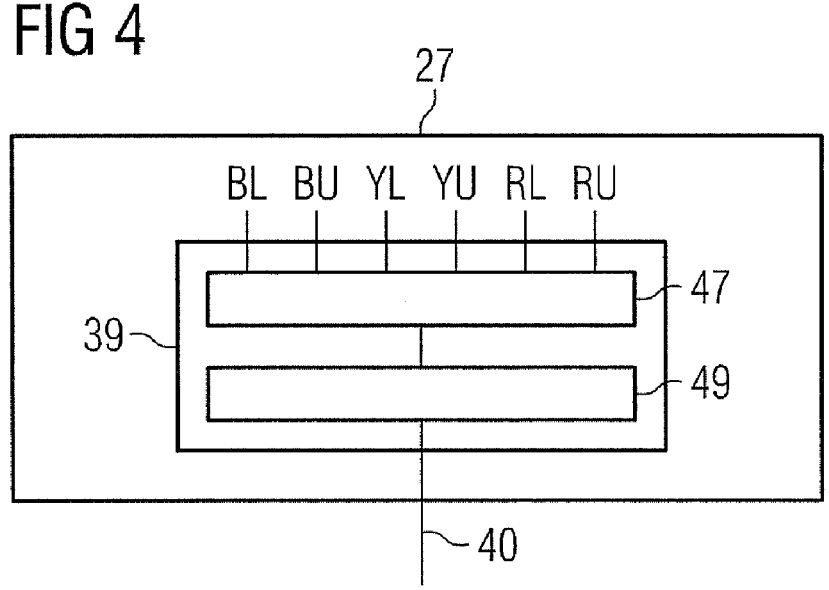
FIG. 4 schematically shows a first embodiment of a circuitry of the inverter.

FIG. 4 shows an inverter module 27 and its circuitry for receiving signals from and sending signals to the central controller 33 in a highly schematic view. The circuitry 39 comprises a decoder circuit 47 for distributing the switching states to the switching devices 35 according to a control message received from the central controller 33 via the serial data link 40. The control message is sent by the central controller 33 in threefold over the serial data link 40. A voting module 49 in the circuitry 39 (or, alternatively, connected to the circuitry 39) receives the threefold control message and runs a majority voting algorithm. The control message is then forwarded to the decoder circuit 47 if all three copies of the control message are identical. In case only two of the three copies are identical for a certain bit, the bit contained in these two control messages is used in the version of the control message forwarded to the distribution circuit 47. In case all three control messages differ from each other in a certain bit the voting module may either set the inverter module 27 to a fault state, or may keep the previously set switching states until the next threefold control message arrives. In case also in this next control message all three copies of the control message differ from each other the inverter module 27 is set to a fault state. Otherwise, the switching states contained in this control message are distributed to the active switching devices 35 so that the operation of the inverter module 27 can continue. Hence, by the alternative described with respect to FIG. 4 the converter is able to carry on running even in the event of a single message error. Although, in case of a single message error, the respective inverter module receiving the single message error will be in a incorrect state for 2 μs time period, which results in a small amount of waveform distortion, the system and the appliance connected thereto can be laid out so that such a waveform distortion is tolerable.

Figure 5:
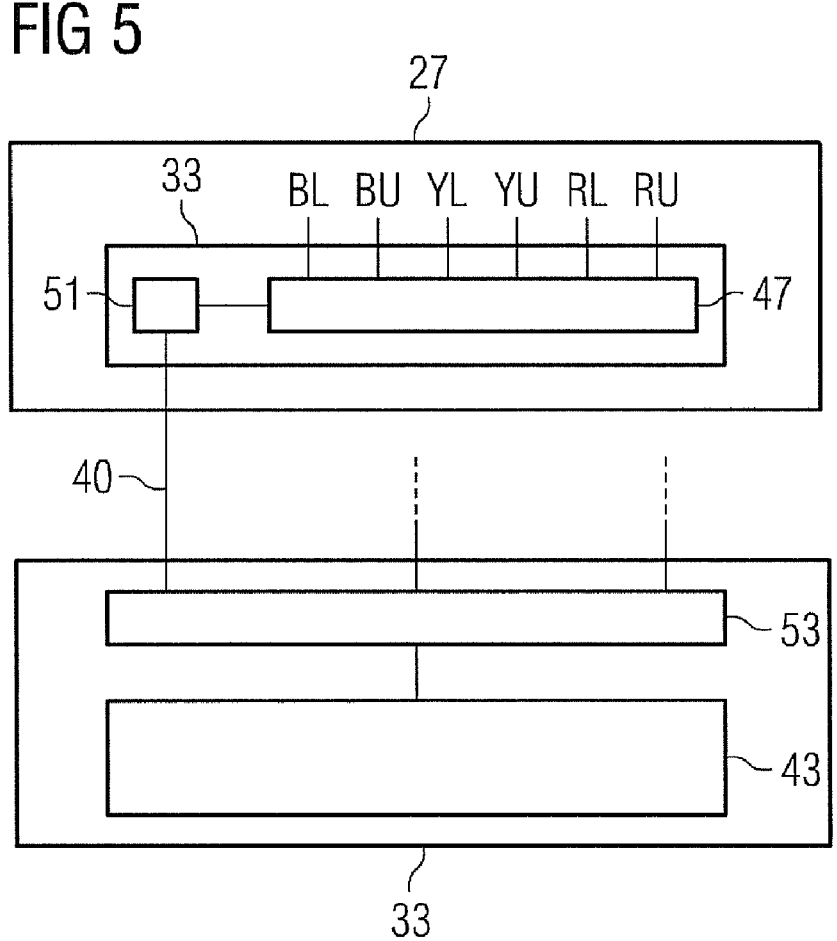
FIG. 5 schematically shows a second embodiment of a circuitry of the inverter and the central controller.

A second alternative which allows the inverter to carry on running in case of a message error is shown in FIG. 5. The Figure shows an inverter module 27 with its circuitry 33 which contains the decoder circuit 47 described with respect to FIG. 4 and a CRC-check module 51. The central controller comprises a CRC-code generator 53 that generates, for each control message, a check sum and adds the check sum to the control message before sending it to an inverter module 27 via the serial data link 40. In the inverter module 27 receiving the control message, the CRC-check module recalculates the CRC-code and, in case the CRC-code is found to be identical with the received code, forwards the control message to the decoder circuit 47. In case the CRC-check module calculates a CRC-code different to the received CRC-code the control message is not forwarded to the decoder circuit 47, and either the inverter module 27 is set to a fault state or, preferably, the active switching devices are kept in the states they have been set according to the previously received control message. When then the next control message is received and the CRC-code calculated by the CRC-check module 51 is identical with the received CRC-code this control message is forwarded to the decoder circuit 47, and the respective switching states are distributed to the active switching devices 35. In case also the CRC-code of said following message calculated by the CRC-check module 51 differs from the received CRC-code the inverter module 27 is set to a fault state.

Both methods, majority voting and CRC-check may be combined.

To summarize, a message error may be detected and, if possible, corrected by a majority voting algorithm or detected by a CRC-check-algorithm. In case only a single message error is detected and the following control message is error free the system can just be kept in the previously set switching states so that it might be in an incorrect state until the next timing cycle. If two consecutive control messages contain errors the respective inverter module is set to a fault state. Note, however, that it is not mandatory to set the inverter module to a fault state if two consecutive control messages contain errors. If the inverter module and the appliance controlled by the converter module tolerate incorrect switch states for more than one timing cycle an inverter module may be set to fault state only when more than two consecutive control messages contain errors.

In case the control message contains an error in its timing data these errors can be handled by the inclusion of additional logic at the receiving circuitry, which ensures the immediate requirements of the converter bridges are satisfied, for example that the dead times and minimum on/of times are respected.

As already mentioned with respect to FIG. 3, the communication links interconnecting the central controller 33 and the inverter modules 27_1, 27_2, 27_3 are full-duplex links. This means that, at the same time data is transmitted from the central controller 33 to the inverter modules 27_1, 27_2, 27_3, data can be transmitted from the inverter modules 27_1, 27_2, 27_3 to the central controller 33. Such data transmitted from the inverter modules to the central controller may include voltage feedbacks, current feedbacks, intervention signals, for example a disable signal in the event of an overcurrent, etc. In this way, a coordinated shut down of the parallel or series connected inverter modules can be achieved, using the single cable communication system without the need for extra dedicated communication lines. Hence, although, according to the invention described with respect to FIGS. 1 to 5, each converter module of a power converter is connected to a central controller only by a serial cable, like a copper cable or an optical cable, control messages can be sent to the converter modules which fulfill the following requirements:

The edge resolution of switching states in a given pulse width modulation period is less than 100 ns;
The pulse width modulation edge accuracy is less than 100 ns, between converter modules;
A low latency response to error conditions is present, i.e. disable in the event of overcurrent, in less than 5 µs;
A variable and affordable physical media for the interconnections between the main control system (central controller) and distributed converter modules is provided;
Tolerance to single bit errors is provided.

Numbers given in the above list are by way of example, other values may be applicable depending on the characteristics of the power circuit and the associated time constants.

The invention claimed is:

1. A method for controlling conversion of an input power into an output power in a converter module, comprising:
providing an input power terminal and an output power terminal;
providing for the output power terminal an active switching device connected between the input power terminal and the output power terminal; and
controlling a timing of switching the active switching device in each converter module,
wherein the switching is controlled by sending switching control signals from a master controller to the converter module, each switching control signal containing a control message defining a switching state for the active switching devices and time relative to a time reference derived from the master controller at which the defined switching state for the active switching device is to be applied in the converter module,
wherein the switching control signals are sent with a cycle time equal to, or less than, the shortest time constant of the converter module and an immediate power circuit element relating to the converter module, and
wherein a duration of a control message is equal to, or less than, the cycle time.

2. The method as claimed in claim 1,
wherein the switching control signals are sent with a cycle time that is equal to, or less than, a dead time of the active switching device.

3. The method as claimed in claim 1,
wherein the control message contains timing information defining times within a cycle time at which the switching state contained in the control message is to be applied to the active switching device in the converter module, and
wherein a timing information has a time resolution that is higher than the cycle time.

4. The method as claimed in claim 1,
wherein the switching state to be applied to the active switching device of the converter module is contained at least threefold in a control message, and
wherein a majority voting algorithm is applied to the threefold switching state for determining the actual switching state to be applied to the at least one active switching device.

5. The method as claimed in claim 1, wherein
each control message also contains a CRC-code;
a CRC-check is performed on each control message; and
the switching state contained in the control message is not applied to the at least one active switching device of the respective converter module when the CRC-check fails.

6. The method as claimed in claim 4,
wherein the switching state contained in a control message following a predetermined maximum number of control message for which the CRC-check or majority voting, respectively, has failed, is applied to the active switching device when the CRC-check or majority voting, respectively, for said following control message is successful.

7. The method as claimed in claim 5,
wherein the switching state contained in a control message following a predetermined maximum number of control message for which the CRC-check or majority voting, respectively, has failed, is applied to the active switching device when the CRC-check or majority voting, respectively, for said following control message is successful.

8. The method as claimed in claim 1,
wherein full-duplex data transmission is used for transmitting the switching control signal to the at least one converter module.

9. A control system for controlling conversion of an input power into an output power in a converter module, comprising:
an input power terminal;
an output power terminal;
an active switching device connected between the input power terminal and the output power terminal, wherein a timing of switching of the active switching device is controlled;
a master controller which controls the converter module;
a communication link interconnecting the master controller and the converter module;
a timing generator generating a timing signal having a cycle time equal to or less than a shortest time constant of the converter module and immediate power circuit elements relating to the converter module, the timing generator being integrated in or interconnected with the master controller; and
a signal generator integrated in or interconnected with the master controller which generates switching control signals, each switching control signal containing a control message defining a switching state for the active switching device, a duration of each control message being equal to or less than the cycle time,
wherein the communication link is a serial communication link.

10. The control system as claimed in claim 9, wherein the communication link is a full-duplex link.

11. The control system as claimed in claim 9, wherein
at least two converter modules are present which are connected in parallel or in series,
each converter module comprises at least one input power terminal, at least one output power terminal, and
for each output power terminal at least one active switching device is connected between the input power terminal and the respective output power terminal.

12. The control system as claimed in claim 9, wherein the converter module comprises
a high voltage DC terminal and a low voltage DC terminal as input power terminal or output power terminal,
at least two AC terminals as output power terminals or input power terminals, respectively, and, for each AC terminal, at least an upper active switching device connected between the high DC voltage terminal and the respective AC voltage terminal, and at least a lower active switching device connected between the low DC voltage terminal and said respective AC voltage terminal.

13. The control system as claimed in claim 9, wherein the signal generator generates the control message in threefold.

14. The control system as claimed in claim 9, further comprising:
a voting module running a majority voting algorithm on a received control message in the converter module interconnected with the master controller.

15. The control system as claimed in claim 9, wherein the signal generator comprises a CRC-code generator to generate for each control message a CRC-code and to add the generated CRC-code to the respective control message.

16. The control system as claimed in claim 9, further comprising:
a CRC-check module performing a CRC-check on each received control message in the converter module interconnected with the master controller, said CRC-check module blocking the application of the switching state contained in the control message to the active switching device of the converter module in case the received CRC-check fails.

17. The control system as claimed in claim 15, wherein the switching state contained in a control message following a predetermined maximum number of control messages for which the majority voting has failed, is applied to the active switching device when the majority voting for said following control message is successful, or the converter module is set to a fault state otherwise.

18. The control system as claimed in claim 17, wherein the switching state contained in a control message following a predetermined maximum number of control messages for which the CRC-check has failed, is applied to the active switching device when the CRC-check for said following control message is successful, or the converter module is set to a fault state otherwise.

19. A power converter, comprising
at least one input power terminal;
at least one output power terminal;
for each output power terminal, at least one converter module comprising at least one active switching device connected between an input power terminal and the respective output power terminal; and
a master controller which controls the converter module;
a communication link interconnecting the master controller and the converter module;
a timing generator generating a timing signal having a cycle time equal to or less than a shortest time constant of the converter module and immediate power circuit elements relating to the converter module, the timing generator being integrated in or interconnected with the master controller; and
a signal generator integrated in or interconnected with the master controller which generates switching control signals, each switching control signal containing a control message defining a switching state for the active switching device, a duration of each control message being equal to or less than the cycle time,
wherein the communication link is a serial communication link.

* * * * *